United States Patent [19]

Mahmud

[11] Patent Number: 5,075,369

[45] Date of Patent: Dec. 24, 1991

[54] DOUBLE CROSSLINKED BARRIER COATING

[75] Inventor: Meftah U. Mahmud, Nashua, N.H.

[73] Assignee: Nashua Corporation, Nashua, N.H.

[21] Appl. No.: 508,850

[22] Filed: Apr. 12, 1990

Related U.S. Application Data

[62] Division of Ser. No. 218,097, Jul. 12, 1988, Pat. No. 4,927,801.

[51] Int. Cl.[5] .............................................. C08L 29/04

[52] U.S. Cl. .................................... 524/475; 427/150; 427/152; 503/200; 503/206; 503/214

[58] Field of Search ................ 427/150, 152; 503/200, 503/206, 214; 524/475

[56] References Cited

U.S. PATENT DOCUMENTS

| | | | |
|---|---|---|---|
| 4,370,370 | 1/1983 | Iwata et al. | 503/214 |
| 4,591,887 | 5/1986 | Arbree et al. | 503/200 |
| 4,927,801 | 5/1990 | Mahmud | 503/200 |

*Primary Examiner*—Kriellion S. Morgan
*Assistant Examiner*—Tae H. Yoon
*Attorney, Agent, or Firm*—Testa, Hurwitz & Thibeault

[57] ABSTRACT

Disclosed is a heat-sensitive recording material useful in the manufacture of thermal paper and thermal labels. The material comprises a cellulosic or other suitable substrate, a thermally imprintable color-producing layer, and a protective layer over the color-producing layer. It may also include a second protective layer and/or a pressure-sensitive adhesive layer, on the surface of the substrate opposite from the color-producing layer, and a releasable liner covering the adhesive layer. The color-producing layer includes a basic, acid-neutralizing agent for both reducing background discoloration during manufacturing and increasing image definition. The protective layer comprises a polymeric binder which is both ionically and covalently cross-linked to provide improved resistance to hydrophobic and hydrophillic solvents.

3 Claims, 1 Drawing Sheet

DOUBLE CROSSLINKED BARRIER COATING

This is a division of application Ser. No. 218,097, filed July 12, 1988, now U.S. Pat. No. 4,927,801.

BACKGROUND OF THE INVENTION

1. Field of the Invention

This invention relates to a heat-sensitive recording material. More particularly, the invention relates to a heat-sensitive material having an improved protective layer 2. The Prior Art Adhesive-backed, heat-sensitive labels and other thermally sensitive paper stock are widely used in printers and facsimile equipment. Such labels are often placed on goods, including meats, produce or articles of manufacture which are commonly exposed to water, solvents or oleophilic materials during storage, transit or display. Typically, a bar code and/or alphanumeric information may be formed on such labels at the point of sale by imaging the label with a thermal print head.

Known recording materials have a thermally imagable layer comprising a binder, a colorless or pale leuco dye, and an acidic substance that causes the dye to change color upon the application of heat. Labels made from such materials are commonly used in grocery stores, delicatessens, and other points of retail sale of commodities sold by weight. Increasingly, they are used on other products as well. At or prior to a sale, the retailer weighs the product, commonly on a machine which integrates a scale, register, and thermal print head, and actuates the machine to deliver a thermally imprinted label indicating the price, weight, and other information in coded and/or alphanumeric form. The label is then affixed to the product, typically by means of a pressure-sensitive adhesive backing layer.

Labels of this type are often exposed to water, fats, oils, and other solvents which can have an adverse effect on the thermal image. For example, these solvents may increase background discoloration, or, in some cases, destroy the machine readability of the imprinted bar codes. The labels are often supplied in strips to facilitate rapid printing It has also been observed that on occasion such labels cause a discoloration to appear on red meat directly beneath the label.

The use of protective coatings on thermally sensitive materials to protect the thermal image from the deleterious effects of solvents is known. U.S. Pat. No. 4,388,362 to Iwata et al. teaches the application of a water-soluble, resinous protective coating over the heat sensitive layer. Also, U.S. Pat. No. 4,591,887 to Arbree et al. teaches the deposition of a resinous protective layer which is covalently cross-linked by melamine formaldehyde in situ to impart significantly improved solvent resistance. However, these protective layers are subject, in varying degrees, to image fading and penetration by solvents because of the character of the materials from which they are made.

U.S. Pat. No. 4,370,370 to Iwata et al. discloses thermosensitive recording adhesive label having a barrier layer comprised of a carboxylated polyvinyl alcohol which, after the polyvinyl alcohol has been coated, is treated with a metal salt solution to improve water resistance. This treatment may result in a surface cross-linking.

Despite these disclosures there remains a need in the art for thermosensitive recording adhesive labels which provide additional fade resistance and increased resistance to solvents. It is therefore an object of the present invention to provide a thermosensitive recording label capable of retaining images formed on a label for a long period of time despite long term contact with organic resin films. It is a further object of the invention to Provide a thermosensitive recording label which has improved solvent resistance Other objects of the invention will be apparent to those having ordinary skill in the art upon reading this disclosure.

SUMMARY OF THE INVENTION

In one aspect, the invention features a specialty paper or label stock comprising a heat-sensitive recording material. The material comprises a substrate, a heat-sensitive color-producing layer on a first surface of the substrate, and a protective, doubly cross-linked (i.e., covalently and ionically) layer over the color-producing layer. An adhesive layer may be applied on the surface of the substrate opposite the color-producing layer. Preferably, the adhesive is a pressure-sensitive adhesive and is covered with an abhesive, releasable liner.

The color-producing layer may be of a type known in the art, such as that disclosed in U.S. Pat. No. 4,591,887, Col. 4, lines 16–60, which is hereby incorporated by reference. This layer comprises a colorless or pale colored leuco dye, preferably in particulate form, an acidic developer substance to cause the dye to undergo color transformation upon image-wise application of heat to the recording material, a polymeric binder material, and an acid neutralizing (basic), preferably particulate, material for reducing background discoloration.

The protective layer of the present invention provides a further improvement in solvent resistance properties. The protective layer comprises a water soluble, carboxylated polymer which is both covalently and ionically cross-linked, and filler particles which act as spacer particles within the protective layer. The carboxylated polymer preferably comprises a carboxylated polyvinyl alcohol compound. This material may be covalently cross-linked with melamine formaldehyde in the presence of an acid catalyst, preferably an organic acid catalyst, e.g., fumaric acid. Malonic acid, tartaric acid, maleic acid, diglycolic acid, other carboxylic, sulfonic or mineral acids may be used in addition to, or instead of, fumaric acid. The carboxylated polyvinyl alcohol is also ionically cross-linked with metal salts having multivalent metals such as $Ca^{+2}$, $Al^{+3}$, $Mg^{+2}$, $Cr^{+3}$, $Zn^{+2}$ and other di- or tri-valent metal salts. Both cross-linking agents are mixed together with the carboxylated polyvinyl alcohol before the protective layer is applied as a coating to enable the covalent and ionic cross-linking reactions to take place substantially simultaneously in a bulk reaction.

In preferred embodiments, the color-producing layer has a coating weight of approximately 3.0 to 8.0 grams of solids per square meter (approximately 2 to 5 pounds/ream). The binder of the color-producing layer may be a water-soluble material such as polyvinyl alcohol. The leuco dye of the third layer may be a fluoran, phthalide, lactone triaryl methane dye, or others known to those skilled in the art.

The protective layer preferably has a coating weight of about 3.0 to 8.0 grams of solids per square meter (2.0 to 5.0 pounds/ream). The polymeric binder material preferably comprises a carboxylated polyvinyl alcohol.

The inert filler particles preferably comprise particles of alumina trihydrate ($Al_2O_3.3H_2O$).

The recording material preferably also may have a second protective layer disposed on the side of the substrate opposite the imaging layer, i.e., between the substrate and the adhesive layer, if an adhesive layer is employed.

The recording material of the invention is manufactured by the sequential application of two aqueous dispersions to the substrate, typically paper. The first dispersion, in addition to conventional color-producing components and binder, typically includes an acid-neutralizing agent to protect the dye from a premature reactive exposure resulting from the subsequent application of the acidic protective layer.

The second dispersion acts as a solvent resistant, protective coating. In preferred embodiments, the protective coating is manufactured by blending a carboxylated water soluble organic resin, which is ionically and covalently cross-linked in situ with cross-linking agents. The organic resin is preferably a carboxylated polyvinyl alcohol. The preferred covalent cross-linking agent is melamine formaldehyde, however, urea-formaldehyde, dialdehydes, formaldehyde and polyamides may also be used. As noted above, these covalent cross-linking agents should be used in conjunction with an acid for lowering the pH to the range where cross-linking will occur below the temperature at which the imaging layer will develop color. The ionic cross-linking agent comprises the multivalent metal salts such as $Ca^{+3}$, $Mg^{+2}$, $Cr^{+3}$ and $Zn^{+2}$. For every 100 parts by weight resin binder present in the dispersion, there should be present 1–200 parts by weight, preferably 1–100 parts by weight, more preferably 5–80 parts by weight, and most preferably 15–52 parts by weight crosslinking agent. The inert filler particles are present at a level of about 10–500, preferably 20–400, more preferably 50–240, and most preferably about 100–140 per 100 parts resin binder. Application of this mixture to the precoated substrate is accomplished through the use of a Meyer rod, air knife, gravure method or other conventional coating means known to those skilled in the art.

The sequential coating of the substrate thus results in a recording material with improved thermal image stability and solvent resistance.

DETAILED DESCRIPTION OF THE INVENTION

Figure 1:
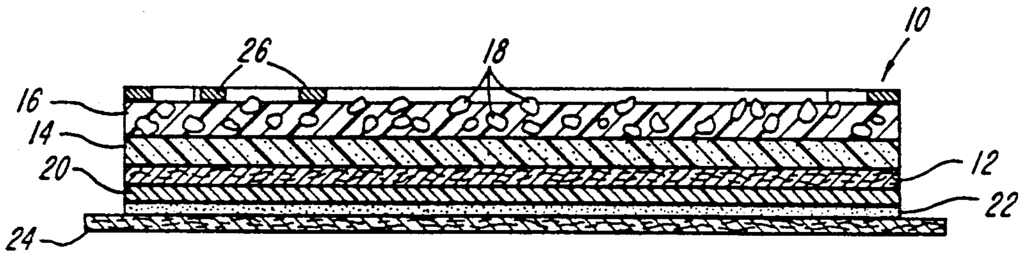
FIG. 1 is a schematic cross-sectional view of a recording label embodying the invention.
Figure 2:
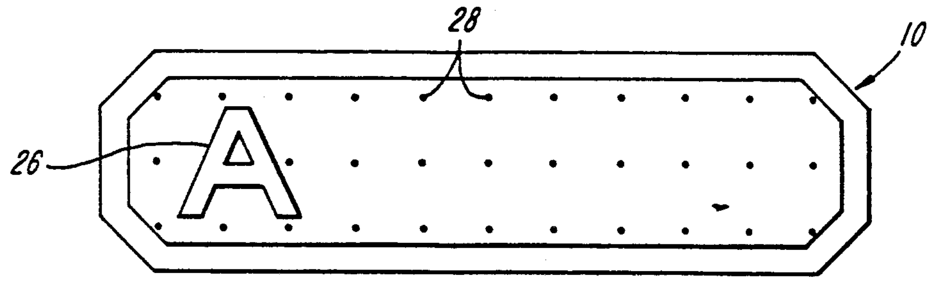
FIG. 2 is a plan view of the front side of the label of FIG. 1.

Referring to the drawings, FIGS. 1 and 2 schematically illustrate a label 10 embodying the invention. Label 10 comprises a typically medium weight cellulosic substrate 12. Adhered to the top side of the substrate is a heat-sensitive color-forming layer 14 that preferably has a coating weight of approximately 3 to 8 grams solids per square meter. Layers 12 and 14 are each disposed between a pair of protective layers 16 and 20. Layer 20 is covered by an adhesive layer 22 which in turn is protected until use by abhesive layer 24.

Layer 14 is a thermally sensitive, imagewise exposable layer which can vary widely in composition, and may include compositions already known in the art. Layer 14 preferably comprises an intimate mixture of pale colored or colorless leuco dye, an acidic substance which functions to develop the dye, a polymeric binder material, and a particulate neutralizing agent.

The dye of layer 14 may be of the type generally known in the art which is activated by contact with a proton donating (acidic) substance such as a metalized (e.g., zincated) organic acid material. The preferred dyes are fluoran, lactone, phthalide, or triaryl methane dyes such as crystal violet lactone, 3-N-cyclohexyl, N-methyl-amino 6-methyl-7-anilino fluoran, or 3-pyrrolidino-6-methyl-7-anilino fluoran. Many other leuco dyes known to those skilled in the art may also be used in the preparation of layer 14. The dye is typically present in particulate form, preferably as micron range sized particles for adequate resolution as known by those skilled in the art.

The acidic developer substance comprises an organic acid material, optionally treated with a metal such as zinc. Examples of materials which may be used include bisphenol A, phenolic condensation products, and various organic acids or esters of organic acids having low melting points. The currently preferred developer material is para-benzyl hydroxybenzoate.

The polymeric binder of layer 14, for processing purposes, is preferably at least partly water-soluble. It comprises one or a mixture of resinous materials which act to hold the other constituents of layer 14 together. The currently preferred binder material is polyvinyl alcohol. Other known binders which may be used include polyvinyl pyrrolidone, polyacrylamide, or modified cellulose compounds.

The neutralizing agent contained in layer 14 may comprise a neutral colored, water-insoluble particulate material which is present at levels of about 3 percent by weight of the dry thermal coatings. Preferably, the neutralizing agent comprises a basic salt such as calcium carbonate. In addition to the foregoing, layer 14 may also include inert fillers, lubricants, dispersants, and defoaming agents present in minor amounts as processing aids.

Adhered to thermally sensitive color-forming layer 14 is a covalently and ionically cross-linked protective layer 16. Protective layer 16 functions to maintain the contrast and readability of thermal images imprinted in layer 14 despite exposure to oils, fats, water, plasticizing agents and the like which may come in contact with the coated stock. The double (i.e., both covalent and ionic) cross-linking of protective layer 16 contributes to its improved impermeability to hydrophillic and hydrophobic solvents. Protective layer 16 is formed in situ from a resin which is both covalently and ionically cross-linked at or above room temperature (provided, however, that the temperature is insufficient to develop the leuco dye) with covalent and ionic cross-linking agents in an acidic environment. The improved insolubility of protective layer 16 to water and other solvents, such as fats and oils, is believed to result from the double cross-linking which occurs in situ during the manufacture of the product of this invention. Preferably, the resin component of layer 16 comprises a major amount of water soluble binder, such as virtually any carboxylated polymer having a pendent hydroxyl group. A preferred binder is a carboxylated polyvinyl alcohol such as Gohsenol T-330 manufactured by Nippon Synthetic Chemical Industry Co., Ltd. of Osaka, Japan, and distributed in the United States by Marubeni American Corporation of New York. Other carboxylated polyvinyl alcohol compounds which may be used with the present invention include Gohsenol T-350, OKS-3381 and OKS-3382 also manufactured by the Nippon Synthetic Chemical Industry Co., Ltd.

During the formation of layer 16, the carboxylated polyvinyl alcohol binder is doubly cross-linked. Ionic cross-linking takes place between the carboxylated group of the binder and multivalent metal salts such as $Ca^{+2}$, $Al^{+3}$, $Mg^{+2}$, $Cr^{+3}$, $Zn^{+2}$, and other di- or trivalent metal salts known to those skilled in the art. At substantially the same time, covalent cross-linking occurs between the hydroxy groups of the binder and cross-linking agents such as melamine formaldehyde or another glyoxyl-type material, multifunctional aziridines or dialdehydes, or other such compounds normally reactive under acid conditions. According to the invention, ionic cross-linking is not carried out as a separate step after layer 16 is formed. Rather, both ionic and covalent cross-linking agents are mixed with the other components which form layer 16. The ionic cross-linkers then selectively react with the carboxy group of the carboxylated polyvinyl alcohol. The covalent cross-linking reaction, which occurs at a slower rate, commences at substantially the same time as the ionic cross-linking reaction, but continues to completion after the coating of layer 16 is applied.

Layer 16 preferably has a coating weight of about 2–5 pounds per ream, and more preferably 2–3 pounds per ream. Layer 16 also includes inert filler particles 18 which act as spacer particles to prevent a thermal printing head from stripping away the protective layer 16.

A preferred filler 18 is alumina trihydrate, ground to a particle size in the range of one micron in diameter. The binder of layer 16 preferably comprises a major amount of carboxylated polyvinyl alcohol covalently cross-linked with a minor amount of melamine formaldehyde and ionically cross-linked with a minor amount of aluminum sulfate ($Al_2(SO_4)_3$). It has been found that cross-linking of the coating is optimized at room temperature (70° F.) and when the pH of the resin mixture is within the range of approximately 3–5 to 5.5. At pH levels above approximately 5.5, the cross-linking reactions, particularly the covalent cross-linking reaction, slow and eventually cease. In order to achieve covalent cross-linking, a sufficient volume of acid is added so as to achieve a pH in the pre-application coating dispersion of no greater than about 3.0. Upon deposition onto the color-forming layer, and exposure to the neutralizing agent therein, the pH of the dispersion rises to the desired range of 3.5 to 5.5, and optimum cross-linking is achieved A preferred acidic substance for this purpose is a dibasic carboxylic acid such as fumaric acid. Other acidic substance which may be used include malonic acid, tartaric acid, maleic acid and diglycolic acid. One skilled in the art may also be able to substitute other carboxylic, sulfonic, or mineral acids for the compounds noted above.

Label 10 also preferably includes a water-insoluble lower protective layer 20, coated on substrate 12, on the side opposite the color-forming layer 14. Layer 20 protects the color-forming layer 14 from contaminants such as oils, water, and plasticizers that may seep through a package to which label 10 is adhered. The lower protective layer 20 may be similar or identical in composition to the protective layer 16, except that it does not necessarily include filler particles 18.

A pressure-sensitive or other type of adhesive layer 22 may be deposited on protective layer 20. Adhesive layer 22 is deposited in a conventional manner, and backed by an abesive releasable liner 24 Abhesive liner 24 may comprise paper coated with silicone another suitable abhesive material. The label may be printed with a suitable ink with a bar code or alpha-numeric character illustrated at 26.

The invention will be further understood from the following non-limiting examples wherein all parts are by weights.

EXAMPLES

The approach to production of the improved thermally sensitive labels, sheets, etc. embodying this invention is to apply the barrier, or protective, layer directly over a previously applied thermally sensitive (or color forming) layer. To produce the thermal layer, one prepares a first dispersion containing the leuco dye and other ingredients set forth below, and a second dispersion comprising the acidic developer material and particulate neutralizing agent. The dispersions are the mixed and applied to a substrate.

Examples of a first dispersion (mixes A, A' and A"), and examples of second dispersion (mixes B and B') are set forth below.

| Thermal Layer | Part |
|---|---|
| Mix Dispersion A | |
| Polyvinyl alcohol (approx. 10% solution) | 110 parts |
| 3-N-cyclohexyl, N-methyl amino-6-methyl-7-anilino fluoran | 50 parts |
| Defoamer (C-1226 Nopco defoamer) | 0.1 part |
| Water | 140 parts |
| Mix Dispersion A' | |
| Polyvinyl alcohol (approx. 10% solution) | 100 parts |
| Crystal Violet Lactone | 60 parts |
| Defoamer (C-1226 Nopco defoamer) | 0.1 part |
| Water | 160 parts |
| Mix Dispersion A" | |
| Carboxy methyl cellulose (approx. 10% solution) | 110 parts |
| 3 Pyrrolidino-6 methyl-7 anilino fluoran | 55 parts |
| Defoamer (C-1226 Nopco defoamer) | 0.1 parts |
| Water | 145 parts |

Mix A, A' and A" may be prepared by first dispersing the ingredients in the water using a Baranco mixer for 15 minutes, and then reducing the particle size by way of attrition for 60 minutes.

| | |
|---|---|
| Mix Dispersion B | |
| Polyvinyl alcohol (approx. 10% solution) | 100.0 parts |
| Water | 140.0 parts |
| Dispersing agent | 2.0 parts |
| Zinc stearate | 10.0 parts |
| Aluminum trihydrate | 27.5 parts |
| p-Benzyl hydroxybenzoate | 20.0 parts |
| Calcium carbonate | 2.5 parts |
| Mix Dispersion B' | |
| Polyvinyl alcohol (approx. 10% solution) | 100 parts |
| Water | 140 parts |
| Dispersing agent | 2 parts |
| Stearamide (stearic acid amide) | 10 parts |
| Talc | 28 parts |
| Bis-phenol A | 20 parts |
| Calcium carbonate (particulate) | 3 parts |

The B or B' mix may be prepared by dispersing the ingredients using a mixer for 15 minutes after all of the dry components are added together. The ingredients are added to the mix tank in the order shown above. The particle size is reduced by attriting for 30 minutes.

Any one of the "A" mix dispersions may be combined with either of the "B" mix dispersions at a ratio of 5 to 15 parts A per 50 parts B. The blend is then coated onto paper e.g., 39 pound (24×36) and dried to produce a dry coating weight of approximately 6 grams per square meter.

Protective Layer

A mixture is prepared by combining approximately 20 grams of carboxylated polyvinyl alcohol (Gohsenol T-330) with approximately 276 grams of water. This mixture is stirred and heated for about 30 minutes at 180° F. Subsequently, about 4 grams of fumaric acid is added to this mixture and it is heated to 180° F. for about 30 minutes while stirring. The mixture is then allowed to cool to room temperature. Four grams of the carboxylated polyvinyl alcohol-fumaric acid solution is combined with about 48 grams of an alumina trihydrate filler (Hydral 710 of Great Lakes Mineral Company) diluted in water to a concentration of 50% to form a pre-blend. The pre-blend is blended for 10 minutes in a Waring blender. Next, 200 grams of the previously prepared carboxylated polyvinyl alcohol-fumaric acid solution is combined with approximately 33 grams of the pre-mix, 2 grams of a melamine formaldehyde covalent cross-linking agent (Cymel 385 of American Cyanamid Company), 2 grams of a 1 percent solution of a nonionic surfactant (Triton X-100 from Rohm & Haas Company), and 0.375 grams of $Al_2(SO_4)_3$, an ionic cross-linking agent. This mixture is then blended for approximately 2 minutes in a Waring blender. The mixture prepared as described above is then coated to a density of approximately 2-3 lbs/ream upon a paper substrate bearing a color forming layer of the type described in the preceding examples by an air knife or gravure coating method.

The protective layer prepared and applied as disclosed above is tested for its resistance to plasticizers, oils and water Plasticizer resistance is ascertained by measuring the image density of the imaged label before and after the label is exposed to a plasticizer. The label is exposed to platicizer by wrapping the labels in Borden Resinite RMF-61 Y PVC film, heating the wrapped label to 100° F. at 2.5 psi for 16 hours. Oil resistance is determined by measuring the image density of the label both before and after exposure of the label to an oil. The label is exposed to oil by spreading soybean oil over the surface of imaged label, and heating the treated label to 100° F. for 16 hours. Water resistance of the imaged labels is found by making image density measurements of the imaged label before and after 16 hours of soaking in water at room temperature.

In Table 1, illustrated below, a prior art protective layer, exemplified by the protective layer described in U.S. Pat. No. 4,591,887, is compared to the protective layer of the present invention. Table 1 compares blackness (indicated by the first value given for a particular sample) and whiteness (indicated by the second value given for a particular sample) of the two protective layers. A higher blackness value indicates a darker image and thus a more improved protective layer.

TABLE I

| Sample | | Initial Density | Plasticizer Resistance | Water Resistance | Oil Resistance |
|---|---|---|---|---|---|
| Prior Art | 1 | 1.33/0.08 | 0.96 | 1.12 | 1.18 |
| | 2 | 1.33/0.08 | 1.02 | 1.12 | 1.15 |
| | 3 | 1.32/0.08 | 0.90 | 1.13 | 1.11 |
| | 4 | 1.34/0.08 | 0.16 | 1.14 | 1.34 |
| | 5 | 1.34/0.08 | 0.15 | 1.14 | 0.23 |
| | 6 | 1.34/0.09 | 0.25 | 1.07 | 0.28 |
| Present Invention | 1 | 1.30/0.08 | 1.27 | 1.20 | 1.27 |
| | 2 | 1.29/0.08 | 1.25 | 1.14 | 1.26 |
| | 3 | 1.31/0.08 | 1.29 | 1.19 | 1.28 |
| | 4 | 1.33/0.09 | 0.63 | 1.22 | 1.13 |
| | 5 | 1.34/0.09 | 1.24 | 1.21 | 0.95 |
| | 6 | 1.33/0.09 | 0.80 | 1.20 | 0.92 |

In the above table, samples 1 through 3 for both the prior art protective layer and the protective layer of the present invention were prepared using a substrate, Fraser 39# paper with a color forming layer exhibiting good environmental resistance and moderate imaging speed (such as that disclosed in U.S. Pat. No. 4,591,887). The remaining samples were all prepared using Port Huron 39# paper substrate with an improved color forming layer having increased environmental resistance and increased imaging speed. The data of Table 1 illustrates that the protective layer of the present invention exhibits significantly improved color density over the exemplary prior art protective layer when tested for plasticizer resistance, water resistance and oil resistance. Moreover, Table 1 demonstrates that the image density for an imaged invention is virtually unaffected by exposure to PVC plasticizer, water or oil.

The image density measurements shown in Table 1 were made at a temperature of 330° F. at 30 psi using a MacBeth 914 Densitometer available from the MacBeth Division of Kollmorgan Corp. of Newburgh, N.Y.

It is understood that the invention may be embodied in other specific forms, not specifically delineated in the above specification examples, without departing from the spirit and scope thereof.

What is claimed is:

1. A protective coating composition for deposit on thermally sensitive marking material comprising water and the following ingredients in the following parts by weight:

| Ingredient | Parts by Weight |
|---|---|
| A covalently and ionically cross-linkable organic, water soluble resin | 100 |
| covalent cross-linking agent | 15 to 30 |
| ionic cross-linking agent | 0.1 to 0.4 |
| organic acid catalyst | 15 to 25 |
| inert filler particles | 50 to 100 |
| surfactant | 0.05 to 0.25, |

said composition forming a protective layer which is covalently and ionically cross-linked throughout its thickness and which imparts to the marking material resistance to background discoloration and fading on exposure to solvents.

2. The composition of claim 1 wherein said organic, water soluble resin comprises a carboxylated polyvinyl alcohol, said covalent cross-linking agent comprises melamine formaldehyde and said ionic cross-linking agent comprises aluminum sulfate.

3. The composition of claim 1 wherein said organic acid catalyst is selected from the group consisting essentially of fumaric acid, malonic acid, tartaric acid, maleic acid and diglycolic acid.

* * * * *

UNITED STATES PATENT AND TRADEMARK OFFICE

CERTIFICATE OF CORRECTION

PATENT NO. : 5,075,369

DATED : December 24, 1991

INVENTOR(S) : Meftah U. Mahmud

It is certified that error appears in the above-identified patent and that said Letters Patent is hereby corrected as shown below:

Column 2, line 7, "Provide" should be --provide--.
Column 2, line 8, a period should appear after "resistance".
Column 3, line 30, "$Ca^{+3}$" should be --$Ca^{+2}$--.
Column 6, line 2, a period should appear after "liner 24".

Signed and Sealed this

Twenty-third Day of March, 1993

*Attest:*

STEPHEN G. KUNIN

*Attesting Officer*

*Acting Commissioner of Patents and Trademarks*